United States Patent [19]
Behrens et al.

[11] Patent Number: 5,315,893
[45] Date of Patent: May 31, 1994

[54] VEHICLE BRAKE MECHANISM

[75] Inventors: Robert N. Behrens, Beaver Dam; Jimmy N. Eavenson, Sr., Juneau, both of Wis.

[73] Assignee: Deere & Company, Moline, Ill.

[21] Appl. No.: 977,387

[22] Filed: Nov. 17, 1992

[51] Int. Cl.$^5$ .............................................. G05G 11/00
[52] U.S. Cl. ...................................................... 74/512
[58] Field of Search ........................ 74/512, 501.6, 504

[56] References Cited

U.S. PATENT DOCUMENTS

| | | | |
|---|---|---|---|
| 513,394 | 1/1894 | Hays | 74/512 |
| 1,098,300 | 5/1914 | Prather | 74/512 |
| 1,222,839 | 4/1917 | Wright | 74/512 |
| 1,396,965 | 11/1921 | Lucand | 74/512 |
| 1,535,092 | 4/1925 | Bell | 74/512 |
| 1,538,677 | 5/1925 | Birkigt | 74/512 |
| 1,547,133 | 7/1925 | Strickland | 74/512 |
| 1,645,846 | 10/1927 | Andres | 74/512 |
| 1,788,861 | 1/1931 | Crawford | 74/512 |
| 1,795,719 | 4/1931 | Hardison | 74/512 |
| 1,805,274 | 5/1931 | Anderson | 74/512 |
| 1,873,906 | 8/1932 | Ring et al. | 74/512 |
| 1,877,385 | 9/1932 | Casaletto | 74/512 |
| 1,907,876 | 5/1933 | Rockwell | 74/512 |
| 1,912,778 | 6/1933 | LaBrie | 74/512 |
| 1,996,332 | 4/1935 | Grinslade | 74/512 |
| 2,873,820 | 2/1959 | Rizzuto | 74/512 |
| 3,398,813 | 8/1968 | Pontani | 188/16 |
| 3,508,454 | 4/1970 | Fanslow et al. | 74/482 |
| 4,086,824 | 5/1978 | Johnson | 74/481 |
| 4,248,331 | 2/1981 | Behrens | 192/13 R |
| 4,298,108 | 11/1981 | Hutchison | 192/13 R |
| 4,496,035 | 1/1985 | Wanie | 192/4 C |
| 4,759,417 | 7/1988 | Wanie et al. | 180/6.34 |
| 4,883,137 | 11/1989 | Wanie et al. | 180/6.34 |
| 4,969,533 | 11/1990 | Holm et al. | 180/273 |
| 5,022,477 | 6/1991 | Wanie | 180/6.34 |
| 5,096,032 | 3/1992 | Hutchison et al. | 192/4 A |
| 5,152,382 | 10/1992 | Hoch | 192/4 R |

Primary Examiner—Leslie A. Braun
Assistant Examiner—Ryan W. Massey

[57] ABSTRACT

A vehicle brake mechanism having a foot pedal and hand lever brake controls engagable by the operator and coupled with a generally transversely extending shaft pivotable in response to the operator engaging the brake controls, left and right linkages coupled between respective vehicle brakes and the transverse shaft, and shiftable generally with the transverse shaft for applying respective vehicle brakes. Left and right equalizer mechanisms are coupled between the transverse shaft and respective linkages for generally equalizing and balancing the forces applied to each vehicle brake. The linkages include a rod. Each equalizer mechanism includes a pair of outer levers extending from the transverse shaft for pivotal motion therewith, a spacer slidably carried on the rod and abutable with the lever as the lever pivots with the transverse shaft, a compression spring compressed between the spacer means and a first washer means coupled with the rod, a second washer coupled with the rod and abutable with the spacer when the outer lever has not pivoted from a brake disengaged position. The transverse shaft is pivotally coupled with the vehicle at two laterally spaced locations.

11 Claims, 4 Drawing Sheets

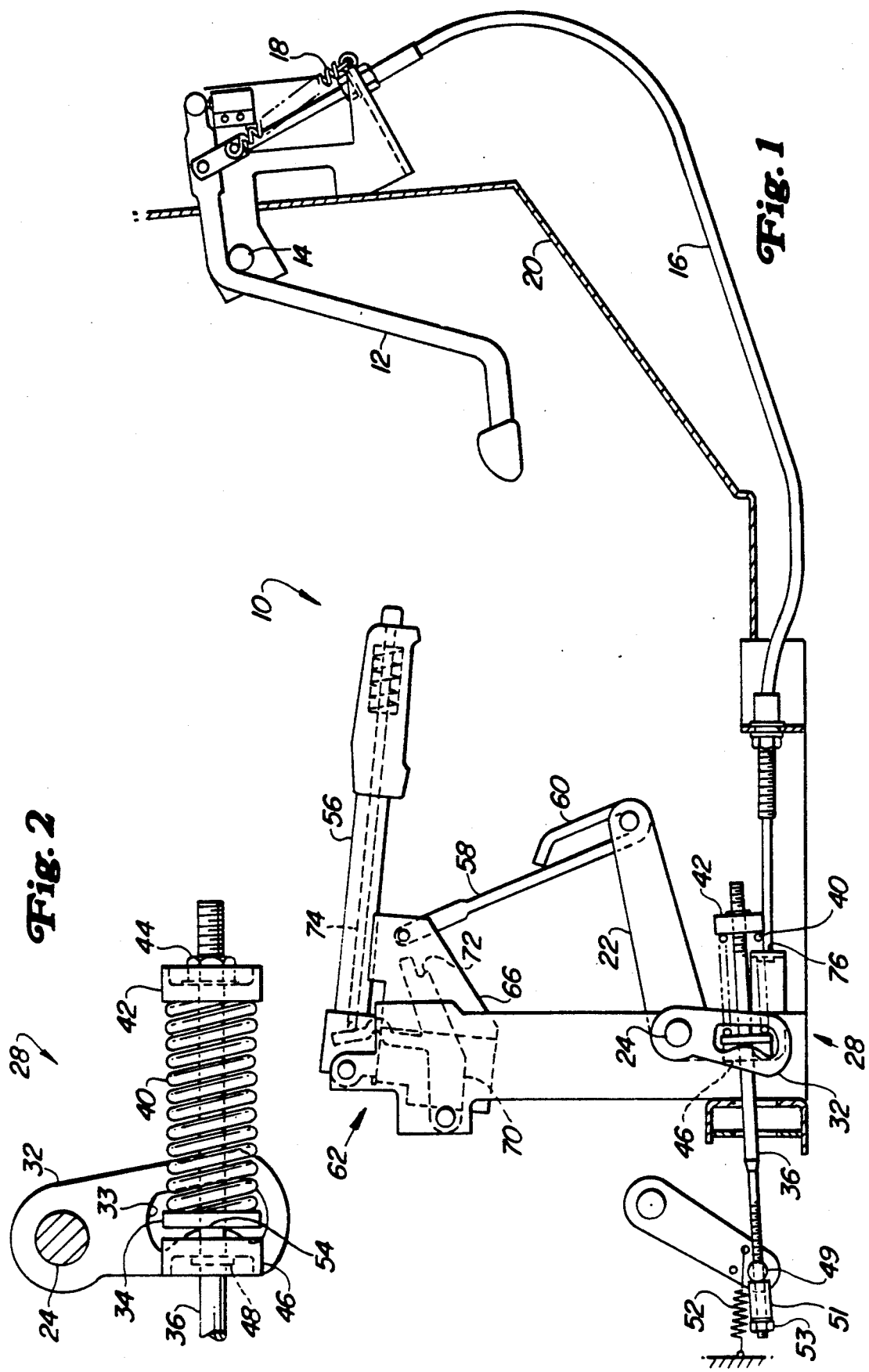

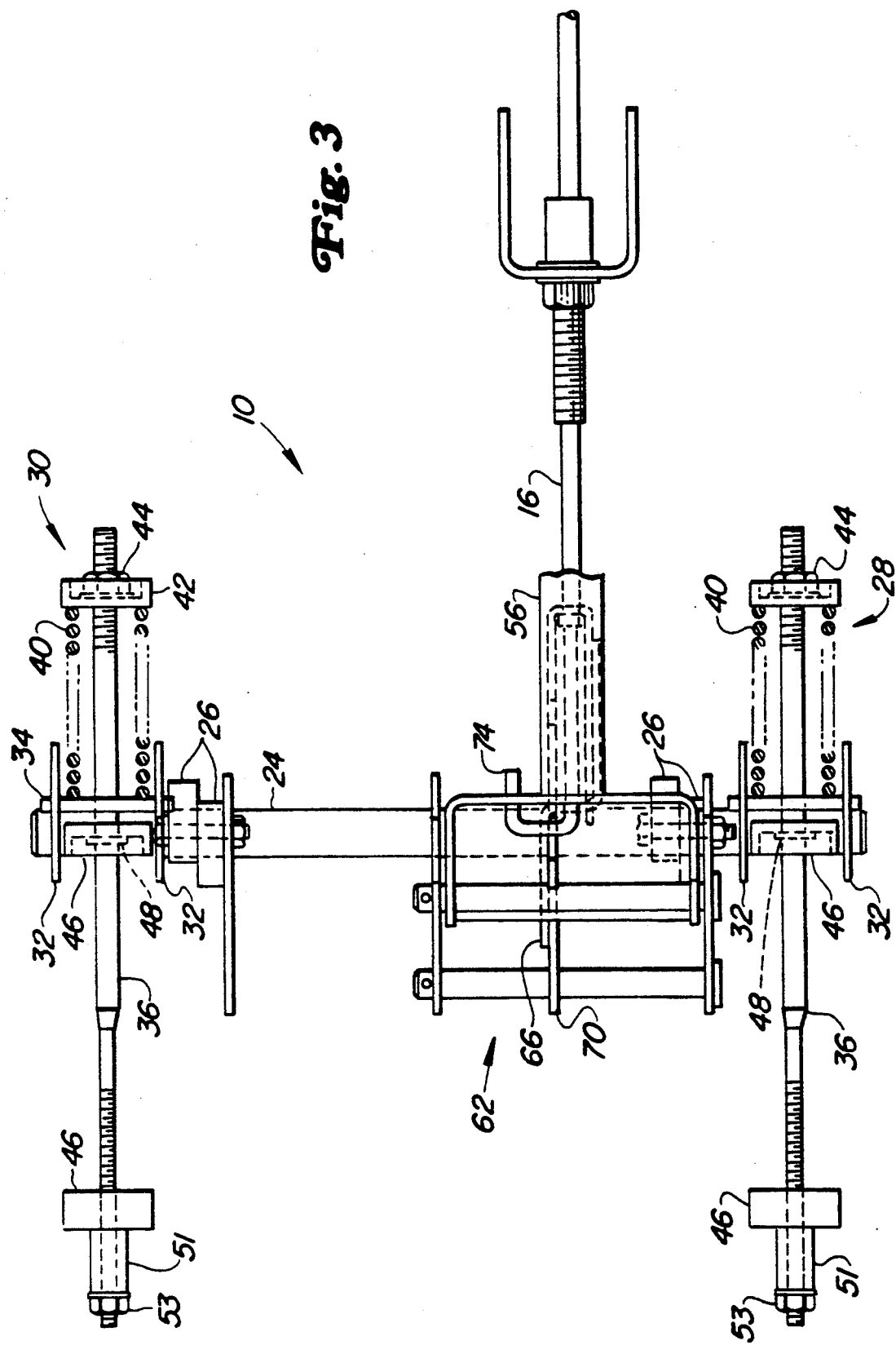

VEHICLE BRAKE MECHANISM

BACKGROUND OF THE INVENTION

This invention relates to brake linkages which extend between vehicle brakes and operator controls such as foot pedals or hand levers.

Conventional vehicles typically provide a single brake which is linked to a single brake control. A parking brake is often provided for locking the control or a portion of the linkage in an engaged mode.

It is known to provide right and left respective brakes which can be used for steering the vehicle. Typically each side brake has an independent linkage to a pedal or control which is independently operable to steer the vehicle by braking one side. A latch is often provided for coupling the pedals together to thereby cause both brakes to be applied together. However, inaccuracies in the lengths of the independent linkages, and wear in the various parts and brakes can cause the brakes to be applied at different rates such that the vehicle still executes at least a slight turn. These conventional mechanisms typically do not equalize the forces applied to the respective brakes.

Another type of brake mechanism provides right and left brakes which are each independently coupled via tension cables or rods to the lateral ends of a horizontal shaft. As the shaft is pulled, both tension cables are pulled, thereby applying both brakes. When the operator engages the brake control, the shaft is pulled and will also pivot slightly about a vertical axis to take up any slack or difference in length of the left and right tension cables. The pivotal motion of the shaft about the vertical axis thereby first compensates for linkage slack or length differences, and then applies the left and right brakes generally equally. When one of the linkages extending between one of the vehicle brakes and the shaft becomes disengaged, the shaft can pivot excessively about its vertical axis when the control is engaged, and the other side brake may thereby be rendered inoperative.

It would be desirable to provide a brake mechanism which equalizes the brake force applied to right and left vehicle brakes, and which is adjustable to compensate for manufacturing inaccuracies or wear over time. It would also be desirable to provide a brake mechanism which is engagable by either a hand lever or a foot pedal. It would be desirable for such a hand lever to be operative to engage a parking brake feature, and for the foot pedal to be operatively engagable to assist the operator in applying the parking brake. It would further be desirable for such a mechanism to allow the portion of the linkage which extends to one side brake to remain operative if and when the linkage to the other side brake becomes disengaged and inoperative.

SUMMARY OF THE INVENTION

The preferred embodiment of the present invention provides a hand lever and a foot pedal which are each coupled to a first crank member via lost motion couplings. The first crank means is fixed for pivotal motion with a transversely extending shaft. Right and left equalizing mechanisms are coupled with the outer end portions of the transverse shaft. Right and left rods extend rearwardly from respective equalizing mechanisms to be coupled with respective right and left brake arms. The equalizers include compression springs positioned between a rectangular spacer and a first washer. When the brakes are fully applied, the outer levers press the rectangular spacers against the compression springs, thereby shifting the rods to apply the vehicle brakes. The compression springs act to apply a generally equal or balanced force to the brake arms such that the right and left brakes are applied evenly. When the brakes are fully applied, a gap exists between the rectangular spacer and a second washer. The operator can adjust the lengths of these gaps by adjusting a coupler nut threaded on the rod adjacent the brake arm. By maintaining gaps of equal recommended length, wear which occurs in the compression springs over time is compensated for such that equal or balanced forces are applied to the brakes. If either right of left rod becomes disengaged, the operator can still operate the hand lever or foot pedal to engage the brake on the other side of the vehicle.

BRIEF DESCRIPTION OF THE DRAWINGS

FIG. 1 is a partial side view of the brake linkage mechanism according to the preferred embodiment of the present invention with the brake in a disengaged mode.

FIG. 2 is a partial side view of the right equalizer mechanism according to the preferred embodiment with the brake in a fully engaged or parked mode.

FIG. 3 is a partial top or plan view of the preferred embodiment of the present invention with the foot pedal depressed to apply the brake.

DESCRIPTION OF THE PREFERRED EMBODIMENT

Figure 4:
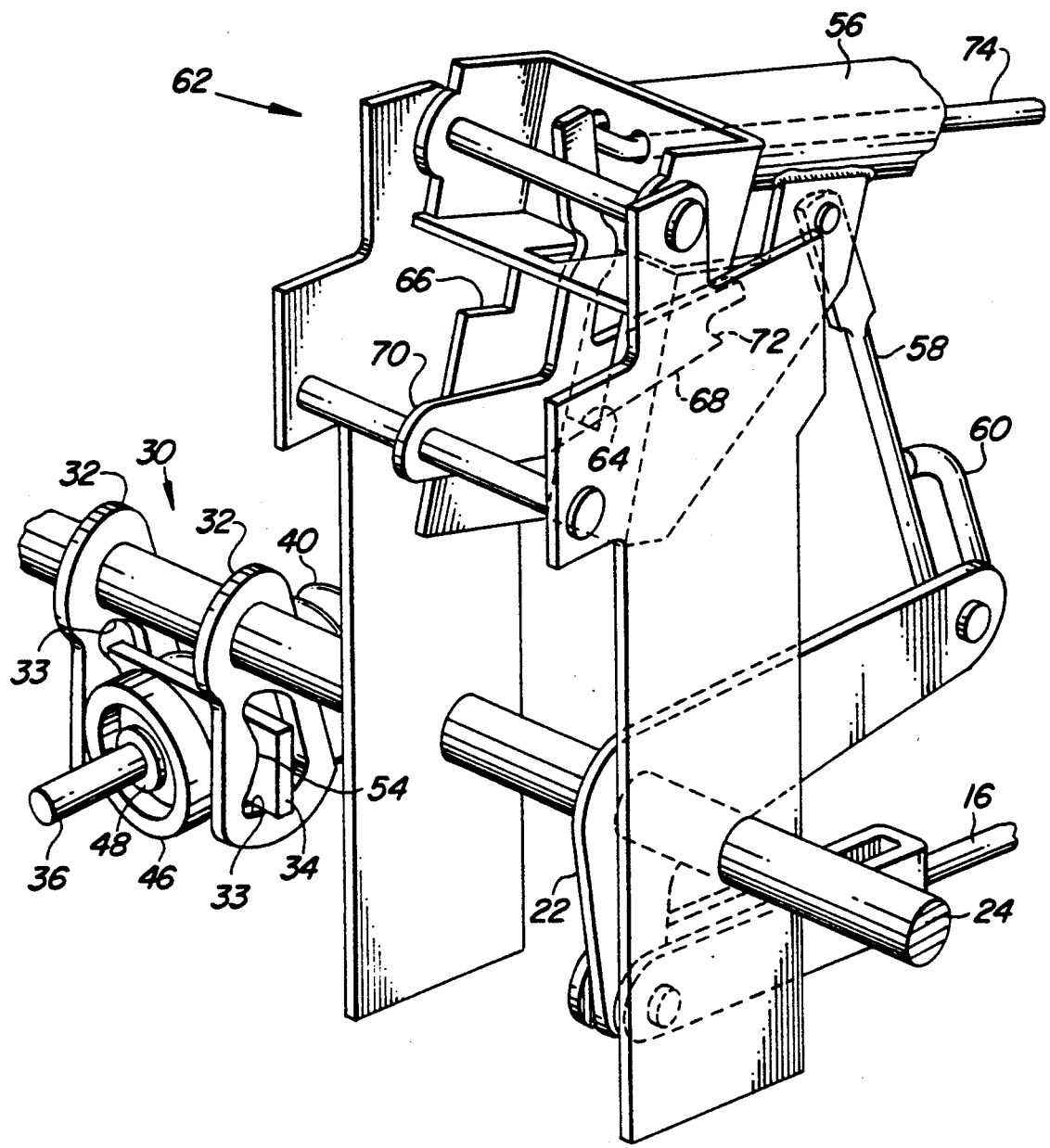
FIG. 4 is a partial perspective view of the preferred embodiment, showing the central lever, left equalizer mechanism, and the latch mechanism, and showing the hand lever in a lowered, disengaged position, and the left equalizer mechanism.
Figure 5:
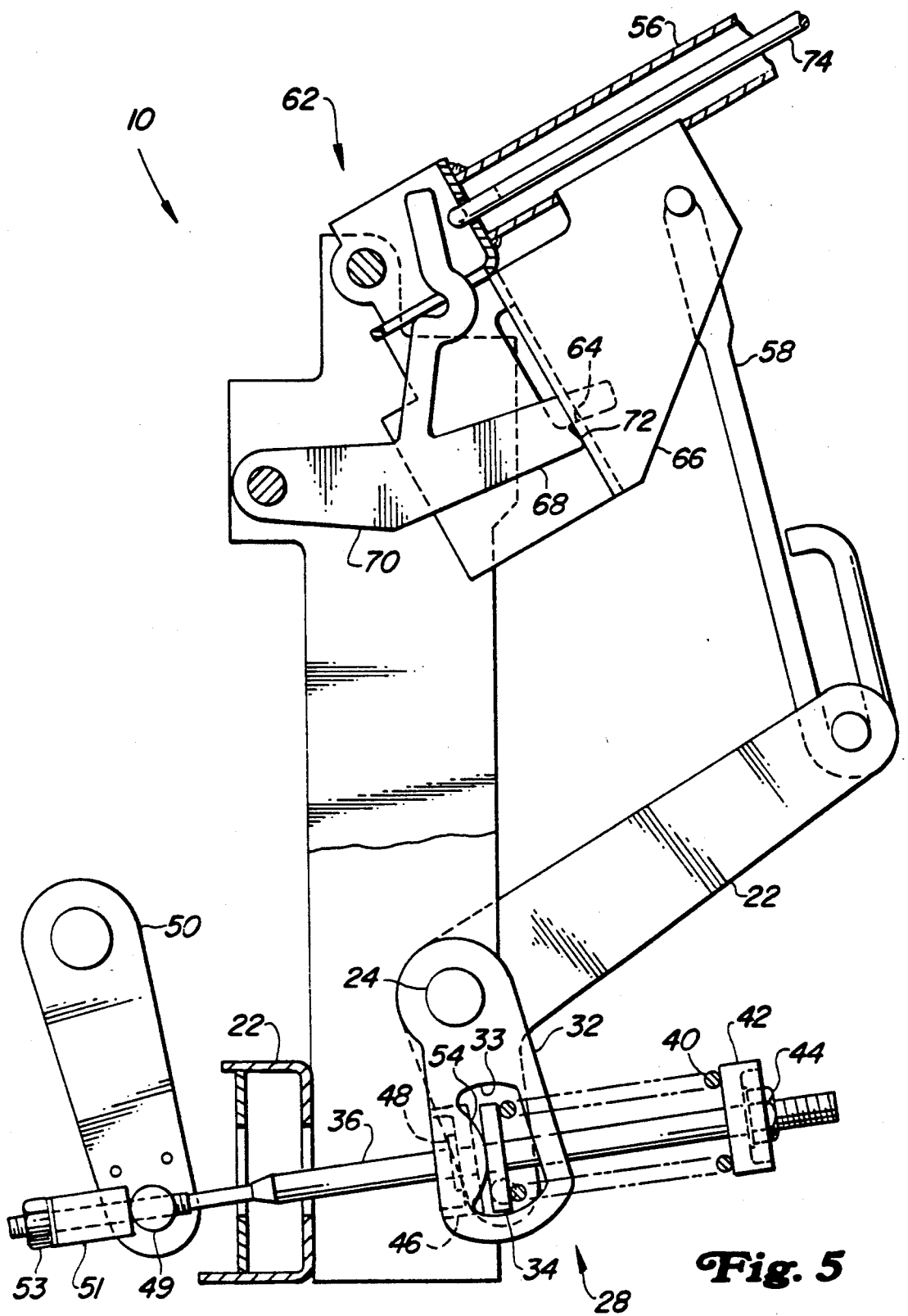
FIG. 5 is a partial side view of the preferred embodiment with the hand lever fully raised and the parking brake feature applied.

Referring now to FIG. 1, there is shown a vehicle brake mechanism 10 according to the preferred embodiment of the present invention. A foot pedal 12 is pivotable about a bearing 14 and is coupled with a cable 16 for pulling the cable 16 as the operator depresses the pedal 12. A spring 18 is coupled between the pedal 12 and a portion of the vehicle frame 20 for biasing the pedal 12 to its raised, undepressed position. The cable 16 extends rearwardly and is coupled to a central lever or first crank 22, which is fixed to the central portion of a pivotable transverse shaft means 24. The shaft 24 is supported for pivotal motion by a plurality of bearings 26 positioned near the outer portions of the transverse shaft 24. As the cable 16 is pulled forwardly when the operator depresses the pedal 12, the central lever 22 pivots forwardly and the transverse shaft 24 pivots therewith.

At the left and right outer end portions of the transverse shaft 24 are respective left and right equalizing mechanisms 28 and 30. The right and left equalizing mechanisms 28 and 30 are generally identical, and therefore only the right equalizing mechanism 28 will be discussed. A pair of spaced apart outer levers or second cranks 32 are coupled for pivotal motion with the right outer end portion of the transverse shaft 24. Openings 33 are defined in the outer levers 32, and a rectangular spacer 34 extends laterally through the openings 33. A linkage means or rod 36 extends longitudinally between the outer levers 32, and through an opening 38 in the rectangular spacers 34. A compression spring 40 is carried on the rod 36 between the rectangular spacer 34 and a first washer member 42 held in place by an adjustable nut 44. The nut 44 is threaded onto the end portion of the rod 36 and is adjustable to set the preload in the compression spring 40. A second washer member 46 is positioned on the side of the rectangular spacer 34 opposite the compression spring 40. The second washer 46 abuts against a ledge 48 formed on the rod 36. The rod 36 extends further rearwardly through a brake pivot 49 operatively coupled with a 20 brake arm 50 which controls the vehicle's right brake. A coupler nut 51 is adjustable threaded on the rod in abutment with the brake pivot 49. A securing nut 53 maintains the coupler in secure position. A tension spring 52 biases the brake arm 50 to an unbraked mode. During operation the outer levers 32 pivot forwardly with the transverse shaft 24 as the pedal 12 is depressed. A rounded portion 54 of the outer lever's opening 33 shifts forwardly to abut against the rectangular spacer 34, thereby compressing the spring 40 against the first washer member 42 for shifting the rod 36 forwardly. The forward shifting of the right rod 36 pivots the brake arm 50 forwardly to apply the right brake. The right equalizing mechanism 28 operates generally in unison with the left equalizing mechanism 30 as the transverse shaft 24 pivots.

A hand lever 56 is providing for allowing the operator to apply the brake with his hand, and for locking the brakes in a parked mode. A lever rod 58 extends downwardly from the hand lever 56, and includes a hooked lower portion 60. The hooked portion 60 engages a portion of the central lever 22. As the operator pivots the hand lever 56 upwardly, the lever rod 58 and central lever 22 shift upwardly, causing the transverse shaft 24 to pivot. Pivoting of the transverse shaft 24 causes the equalizing mechanisms 28 and 30 to operatively pivot the brake arms 50 to the engaged positions.

A latch mechanism 62 is provided for releasably locking the hand lever 56 in an applied or engaged mode, thereby providing a parking brake function. To engage the parking brake the operator pivots the hand lever 56 upwardly. An edge portion 64 of a plate member 66 which is fixed for pivotal motion with the hand lever 56 pivots upwardly in engagement with the lower edge of a park brake pawl 70. Once the edge portion 64 of the plate 66 pivots forwardly past a tooth portion 72 of the park brake pawl 70, the park brake pawl 70 falls downwardly under its own weight, and the tooth portion 72 of the park brake pawl 70 blocks the plate 66 from pivoting back downwardly to the brake-disengaged position. The hand lever 56 thereby becomes locked in its parked mode. To disengage the parking brake, the operator lifts the hand lever 56 slightly, and presses a park brake rod member 74 which is positioned within the hand lever 56. The park brake rod 74 abuts a portion of the park brake pawl 70 to pivot the pawl 70 rearwardly, thereby lifting the tooth portion 72 out of engagement with the portion 64 of the plate member 66. The plate member 66 and hand lever 56 are thereby provided clearance to pivot downwardly again to a brake disengaged position.

Lost motion mechanisms are provided between the hand lever 56 and foot pedal 12 to allow either control to be engaged without altering the position of the other control. The hooked portion 60 of the lever rod 58 acts as a slot for allowing clearance for the central lever 22 to pivot upwardly when the foot pedal 12 is engaged without causing the hand lever 56 to change positions. Similarly, the cable 16 is slidably received within an opening 76 formed in the central lever 76, thereby allowing the central lever 76 to pivot forwardly when the hand lever 56 is engaged without shifting the pedal 12 to a different position. However, the hand and foot controls 56 and 12 are operatively interconnected such that both controls can be actuated to help the operator apply the brakes. If an operator is applying the parking brake by lifting the hand lever 56 he can simultaneously depress the foot pedal 12 to assist or facilitate application of the brake.

The equalizer mechanisms 28 and 30 serve to equalize the force applied to the respective right and left brakes. As the transverse shaft 24 pivots, the outer levers 32 press the rectangular spacers 34 against the compression springs 40 and thereby force the rods 36 forwardly. The compressive force being applied by each spring 40 determines the amount of force applied to the respective brake arm 50, and the right and left compression springs 40 apply a generally equal force to the brake arms 50. When the operator engages the brake, the transverse shaft 24 and equalizing mechanisms 28 and 30 act to apply a force to each brake without displacing the outer levers or pivoting the transverse shaft 24 about a vertical axis to compensate for slack or rod length differences.

over time, various parts such as the compression springs 40 are subject to wear. The compression springs 40 may eventually wear such that they exert different forces when they are compressed a given distance. The equalizer mechanisms 28 and 30 are adjustable to compensate for such wear over time. To adjust the equalizers 28 and 30, the parking brake is first applied. The right and left coupler nuts 51 threaded onto the rod 36 are then adjusted such that the gaps 78 defined between respective right and left rectangular spacers 34 and second washers 46 are equal. The preferred embodiment should be adjusted to provide a 4 mm gap. Providing the same sized gap 78 between the rectangular spacer 34 and the second washer 46 when the brakes are fully applied insures that a generally equal force is being applied to the respective brake arms 50 during braking of the vehicle.

If one of the brakes, or one of the left or right rear side linkages were to become disengaged or inoperative, the present invention allows the other brake to be applied. If, for example, the left rod 36 were to be operatively disengaged from the left brake arm 50, the laterally spaced bearings 26 hold the transverse shaft 24 in position such that when the operator engages the hand lever 56 or the foot pedal 12 to apply the brake the transverse shaft 24 pivots normally to engage the right brake. The laterally spaced bearings 26 generally prevent the transverse shaft 24 from pivoting about a vertical axis as the central lever 22 pivots. Therefore, the transverse shaft 24 will pivot about its longitudinal axis to cause the operative right side brake to be applied with generally the same force as if the left side of the linkage were operative.

We claim:
1. A vehicle brake mechanism, comprising:
a brake control means engagable by the operator,
a generally transversely extending shaft means pivotable in response to the operator engaging the brake control, respective left and right linkage means coupled between respective vehicle brakes and the transverse shaft, and shiftable generally with the transverse shaft for applying respective vehicle brakes, wherein each linkage means further comprises a rod, left and right equalizer means coupled between the transverse shaft means and respective linkage means for generally equalizing and balancing the forces applied to each vehicle brake, wherein each equalizer means further comprises at least one lever extending from the transverse shaft means for pivotal motion therewith, a spacer means slidably carried on the rod and abutable with the lever as the lever pivots with the transverse shaft means, a compression spring abutable with the spacer means, a first washer means coupled with the rod, said compression spring being compressed between the spacer means and said first washer means, a second washer means coupled with the rod and abutable with the spacer means when the lever has not pivoted from a brake disengaged position.

2. The invention of claim 1, wherein the transverse shaft means is pivotally coupled with the vehicle at at least two laterally spaced locations.

3. The invention of claim 1, wherein the equalizer mechanism has a fully engaged position for fully applying the vehicle brakes, said spacer means and said second washer means being spaced from each other when the equalizer mechanism is in the fully engaged position, and a coupler nut is threaded on the rod and is adjustable to adjust the gap between the respective spacers and second washer means when the equalizer means is in the fully engaged position.

4. The invention of claim 2, and further comprising a first crank means coupled for pivotal motion with the transverse shaft, said brake control means being operatively coupled with the first crank means for pivoting the transverse shaft.

5. The invention of claim 4, wherein the brake control means further includes a foot pedal operatively coupled with the first crank means via a lost motion coupling for affecting pivoting of the transverse shaft as the foot pedal is depressed, and a hand lever operatively coupled with the first crank means via a lost motion coupling for affecting pivoting of the transverse shaft as the hand lever is pivoted, wherein said lost motion coupling between the hand lever and the first crank means allows the foot pedal to engage the vehicle brakes without altering the position of the hand lever, and said lost motion coupling between the foot pedal and the first crank means allows the hand lever to engage the vehicle brakes without altering the position of the foot pedal, said lost motion couplings also allowing both the hand lever and the foot pedal to be engaged simultaneously to assist in braking the vehicle.

6. A vehicle brake mechanism, comprising:
a brake control means engagable by the operator,
a shaft means pivotable in response to the operator engaging the brake control, respective left and right linkage means coupled between respective vehicle brakes and the shaft means and shiftable generally with the shaft means for applying respective vehicle brakes, left and right equalizer means coupled between the shaft means and respective linkage means for generally equalizing and balancing the forces applied to each vehicle brake, wherein each equalizer means further comprises at least one lever extending from the shaft means for pivotal motion therewith, a spacer means slidably carried on the linkage means and abutable with the lever as the lever pivots with the shaft means, a compression spring abutable with the spacer means, a first washer means coupled with the linkage means, said compression spring being compressed between the spacer means and said first washer, a second washer means coupled with the linkage means and abutable with the spacer means when the lever means has not pivoted from a brake disengaged position.

7. The invention of claim 6, wherein the shaft means is pivotally coupled with the vehicle at at least two laterally spaced locations.

8. The invention of claim 6, wherein the equalizer mechanism has a fully engaged position for fully applying the vehicle brakes, said spacer means and said second washer means being spaced from each other when the equalizer mechanism is in the fully engaged position, and a coupler nut is threaded on the linkage means and is adjustable to adjust the gap between the respective spacers and second washer means when the equalizer means is in the fully engaged position, thereby equalizing the forces applied by the equalizers to respective vehicle brakes.

9. The invention of claim 8 and further comprising a first crank means coupled for pivotal motion with the shaft means, said brake control means being operatively coupled with the first crank means for pivoting the shaft means.

10. The invention of claim 9, wherein the brake control means further includes:

a foot pedal operatively coupled with the first crank means via a lost motion coupling for affecting pivoting of the shaft means as the foot pedal is depressed, and a hand lever operatively coupled with the first crank means via a lost motion coupling for affecting pivoting of the shaft means as the hand lever is pivoted, wherein said lost motion coupling between the hand lever and the first crank means allows the foot pedal to engage the vehicle brakes without altering the position of the hand lever, and said lost motion coupling between the foot pedal and the first crank means allows the hand lever to engage the vehicle brakes without altering the position of the foot pedal, said lost motion couplings also allowing both the hand lever and the foot pedal to be engaged simultaneously to assist in braking the vehicle.

11. A vehicle brake mechanism, comprising:
a brake control means engagable by the operator, a generally transverse extending shaft means pivotable in response to the operator engaging the brake control, respective left and right linkage means coupled between respective vehicle brakes and the transverse shaft, and shiftable generally with the transverse shaft for applying respective vehicle brakes, wherein each linkage means further comprises a rod, left and right equalizer means coupled between the transverse shaft means and respective linkage means for generally equalizing and balancing the forces applied to each vehicle brake, and wherein each equalizer means further comprises at least one lever extending from the transverse shaft means for pivotal motion therewith, a spacer means slidably carried on the rod and abutable with the lever as the lever pivots with the transverse shaft means, a compression spring abutable with the spacer means, a first washer means coupled with the rod, said compression spring being compressed between the spacer means and said first washer means, a second washer means coupled with the rod and abutable with the spacer means when the lever means has not pivoted from a brake disengaged position, wherein said equalizer mechanism has a fully engaged position for fully applying the vehicle brakes, said spacer means and said second washer means being spaced from each other when the equalizer mechanism is in the fully engaged position, and a coupler nut is threaded on the rod and is adjustable to adjust the gap between the respective spacers and second washer means when the equalizer means is in the fully engaged position.

* * * * *

UNITED STATES PATENT AND TRADEMARK OFFICE
CERTIFICATE OF CORRECTION

PATENT NO. : 5,315,893
DATED : 31 May 1994
INVENTOR(S) : Robert N. Behrens et al.

It is certified that error appears in the above-indentified patent and that said Letters Patent is hereby corrected as shown below:

Claim 11, Column 7, line 1, delete "transverse" and insert "transversely".

Claim 11, Column 8, line 10, delete "means".

Signed and Sealed this

Eighth Day of November, 1994

Attest:

BRUCE LEHMAN

Attesting Officer     Commissioner of Patents and Trademarks